May 10, 1960

W. NOACK ET AL 2,935,904

BALANCING APPARATUS

Filed June 6, 1955

INVENTOR
Walter Noack
Fritz Faulhaber
by:
Michael S. Striker
agt.

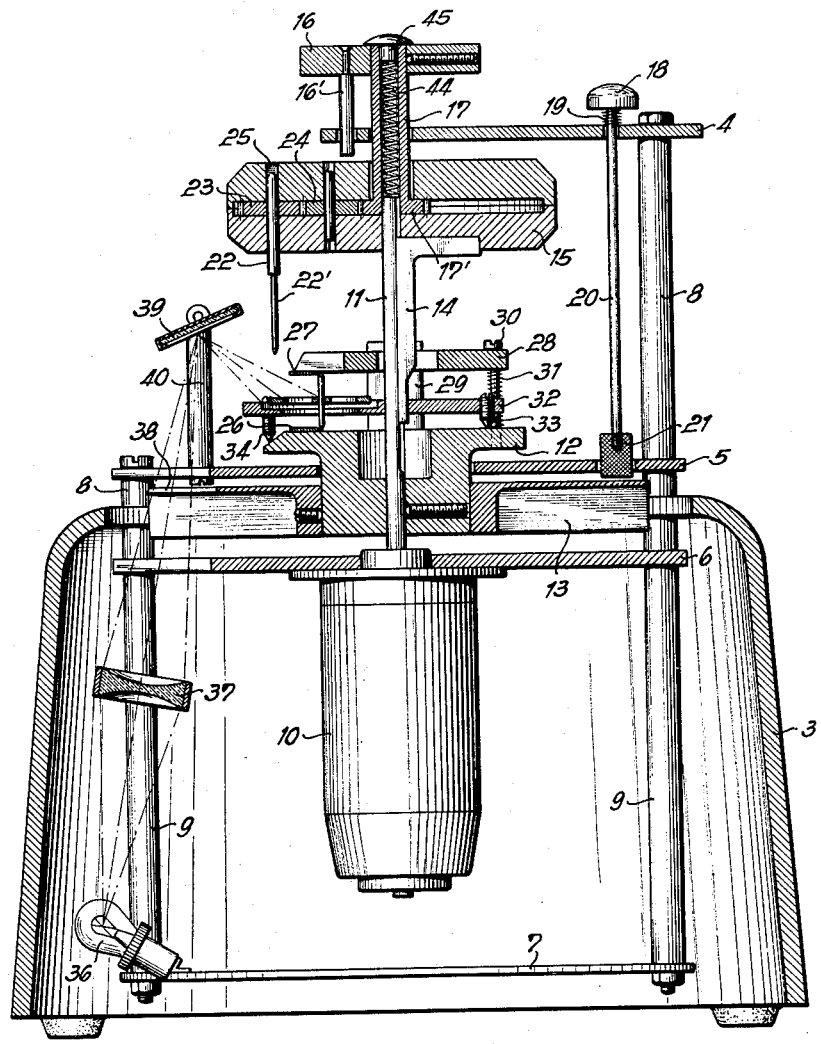

United States Patent Office 2,935,904
Patented May 10, 1960

2,935,904

BALANCING APPARATUS

Walter Noack, Erlangen, and Fritz Faulhaber, Schonaich, Wurttemberg, Germany

Application June 6, 1955, Serial No. 513,422

3 Claims. (Cl. 77—5)

The present invention relates to balancing apparatus of the type used to balance moving members so as to eliminate unbalanced forces.

When balancing members of an extremely small size, such as a balance wheel of a watch, certain problems arise which are not present in the balancing of large bodies.

One of the objects of the present invention is to provide an apparatus capable of quickly placing an unbalanced part of an article to be balanced in a position where this part may be acted on to improve the balance of the article.

Another object of the present invention is to provide an apparatus capable of cutting away part of an article to be balanced simultaneously with the movement of this article in the balancing apparatus of the invention.

A further object of the present invention is to provide an apparatus of the above type with a stroboscope means for rendering the article to be balanced easily observable to the operator.

An additional object of the present invention is to provide an apparatus of the above type with a cooling means which at the same time form a part of the stroboscope means.

With the above objects in view, the present invention mainly consists of a balancing apparatus which includes a carrier means for carrying at a predetermined part thereof an article to be balanced. A support means supports this carrier means for rotation about an axis spaced from the part of the carrier means which carries the article to be balanced, so that the article to be balanced rotates about an axis eccentric to itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 diagrammatically illustrates a conventional means for balancing an article;

Fig. 2 diagrammatically illustrates the principle of the present invention;

Fig. 4 is a sectional elevational view of a structure for carrying out the present invention, the section of Fig. 4 being taken along a central plane of the structure;

Figure 1:
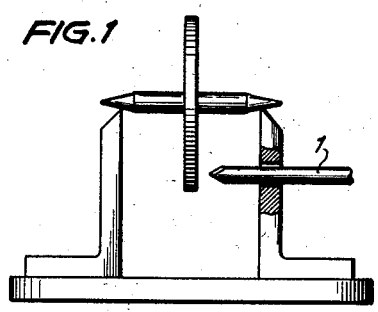

Up to the present time articles such as balance wheels of watches have almost invariably been balanced by placing them on a pair of knife edges as illustrated in Fig. 1. Thus, the shaft which carries the balance wheel of Fig. 1 rests with its edges on a pair of knife edges and, of course, the heaviest part of the wheel becomes located at the lowermost part thereof. A drill 1 is provided to cut away portions of the balance wheel until it is balanced. When the center of gravity of the wheel is in its axis then it is balanced, and with the arrangement shown in Fig. 1, balancing of the wheel is a long tiresome process. The disadvantages of the arrangement shown in Fig. 1 are that even with the greatest care balancing with the precision desired is not always obtainable and moreover the frictional contact between the balance wheel shaft and the knife edges is so great that if the center of gravity is located slightly away from the axis of the balance wheel there will be no indication of this fact.

Figure 2:
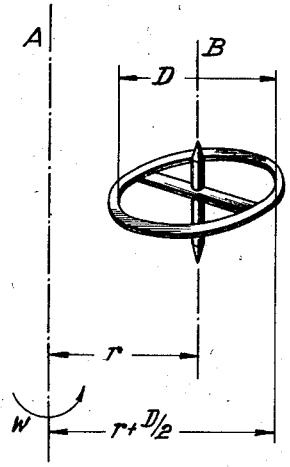

With the structure of the present invention these drawbacks are avoided. The principle of the invention is illustrated in Fig. 2 of the drawings. In Fig. 2 the axis A is an axis about which the article to be balanced, such as the balance wheel shown in Fig. 2, is turned. It will be noted that the axis B of the wheel to be balanced is spaced from the axis of rotation A by the distance $r$. In the example illustrated in Fig. 2 the axes A and B are parallel to each other. In Fig. 2, D represents the median diameter of the rim of the wheel. The entire rotating body may be considered as located along a circle having this diameter and the cutouts in the rotating body in order to balance the same are made along this circle.

Upon rotation of the balance wheel shown in Fig. 2 about the axis A the balance wheel is placed in a non-homogeneous gravitational field which is mathematically a cylindrical field. The balance wheel of Fig. 2 is maintained in the illustrated position with respect to axis A during rotation about this latter axis by a pair of knife edges in a manner described below, and the shaft which extends along the axis of the balance wheel bears against these knife edges during rotation of the wheel with a force $P=mr\omega^2$, that is, the centrifugal force P, with which the wheel bears against the knife edges, is proportional to the mass of the wheel, the turning radius $r$ and the square of the angular speed $\omega$. An eccentric center of gravity of the article to be balanced, which may be considered as a portion of the wheel heavier than other portions thereof, is thrown outwardly by the centrifugal force and remains at the outermost portion from axis A as long as the wheel turns uniformly about the axis A. This heaviest portion of the wheel then becomes located at a distance $r+D/2$ from the axis A, as illustrated in Fig. 2. Since this outermost portion of the wheel is located at a greater distance from axis A than the axis B it is evident that the heaviest portion of the wheel is urged outwardly away from axis A with a force appreciably greater than the force urging the shaft of the wheel against the knife edges. If the distance $r$ in Fig. 2 is made equal to $D/2$, which is not possible for practical reasons, then the sensitivity of the arrangement is increased by the factor 2. If the distance $r$ is made smaller than $D/2$ then it is possible to further increase the sensitivity but there are then two portions of the wheel located at opposite sides of the axis A of which only one is stable.

In addition to the above described increased sensitivity of the arrangement of the invention, the positioning of the balance wheel in its balanced position is greatly accelerated.

For example, with a balance wheel having two radial limbs, as shown in Fig. 2, and having an outer diameter of 8.6 mm. and a thickness of 0.45 mm., the positioning of the wheel on a structure as shown in Fig. 1 for static balancing is brought about by $1\times g$ (the acceleration of the earth). With the arrangement of the invention, however, where the balance wheel rotates at a speed of approximately 3,000 revolutions per minute about the axis A, the force of the weight of the wheel as well as the load at the ends of its shaft is increased 70-fold. The unbalance in the wheel is in this case influenced with a force approximately 130 times as great as the influence produced by the gravitational field of the earth so that (1) The relative sensitivity is increased from 1 to 1.85 and (2) The balance wheel becomes positioned with the unbalanced part located at the outermost position from the axis A 130 times as quickly as with the arrangement of Fig. 1.

Figure 3:
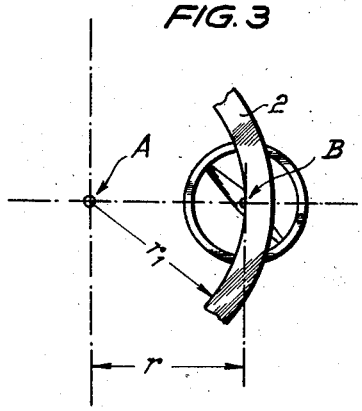
Fig. 3 is a fragmentary diagrammatic view further illustrating the principle of the present invention.

Fig. 3 shows in a plan view one of a pair of knife edges 2 having a radius $r_1$ equal to $r$. These knife edges engage the ends of the shaft of the wheel during rotation thereof together with the knife edges about the axis A which is shown as a point in Fig. 3. Due to centrifugal force the wheel is urged outwardly against the inner peripheries of the knife edges. If the radius $r_1$ is made smaller than the radius $r$ then a result similar to that of Fig. 1 is obtained if the knife edges of Fig. 1 are curved upwardly. On the other hand, if $r_1$ is greater than $r$ then the wheel will tend to roll along the knife edges and will not come to rest. In other words, it is important that the knife edges which engage the ends of the shaft of the balance wheel have inner peripheries located along circles whose centers are in the axis A.

A structure for producing the above described results of the invention is illustrated in Fig. 4. As is shown in Fig. 4 a housing 3 which may be cast from a light metal carries plates 4, 5, 6 and 7 which are located one above another, which are shown in Fig. 4, and which are held together by the columns 8 and 9. These columns are fixed to the housing 3 and serve to maintain the plates 4—7 apart from each other in the position illustrated in Fig. 4. The plate 6 within the housing 3 fixedly carries a motor 10 provided with a long drive shaft 11 extending upwardly therefrom. An annular member 12 is removably fixed to the shaft 11 for rotation therewith, and the member 12 carries a fan 13 which also turns together with the shaft 11. Furthermore, the shaft 11 is formed with a keyway in which a key 14 slides, this key 14 being fixed to the drilling head 15, while the handle 16 is fixed to a shaft 17 extending from the drilling head upwardly through an opening in the plate 4. The hollow shaft 17 is coaxial with the shaft 11 and is turnable within the drilling head 15 in the manner shown in Fig. 4, the shaft 11 extending partly into the tubular portion of shaft 17. Shaft 17 is formed at its lower end as a gear 17' turnable within the drilling head 15, this drilling head being composed, for example, of two halves which are clamped together after member 17 and gears 23 are located therein. As is apparent from Fig. 4 the gear 24 meshes with the gear 17' and in turnable about a pin fixed in the drilling head 15 and the gear 24 in turn meshes with a gear 23 which is fixed to a drill carrier 22 which is rotatable within the drilling head 15. A drill 22' may be releasably fixed to the carrier 22 and a bearing in the form of a hardened member 25, for example, acts as a thrust bearing to prevent upward movement of the carrier 22 with respect to the drilling head 15. The handle 16 in addition to being fixed to the shaft 17 is fixed to a pin 16' which extends downwardly through an opening in the top plate 4 so that the handle 16 as well as shaft 17 cannot turn with respect to the top plate 4. A spring 44 within the tubular shaft 17 bears at one end against the top of shaft 11 and at its opposite end against a plug 45 carried by the shaft 17.

A brake 21 of any fibrous material or the like, for example, extends freely through an opening in the plate 5 and is located just above the top face of the fan 13 which is in the form of an annular plate having vanes extending downwardly therefrom. A rod 20 is fixed to and extends upwardly from the block 21 through an opening in the plate 4, and the top end of the rod 20 is fixed to a handle 18. A spring 19 is coiled about the rod 20 between plate 4 and knob 18 to urge the latter together with the block 21 upwardly to the inoperative position shown in Fig. 4.

The annular member 12 forms part of a carrier means for carrying the article to be balanced. The remainder of this carrier means is carried by the carrier 12 and is in the form of a pair of arcuate knife edges 26 and 27 located along circles whose centers are in the axis of the shaft 11. The lower knife edge 26 is fixed directly to the top face of the annular member 12 as indicated in Fig. 4. The upper knife edge 27 is fixed to the bottom face of a tiltable lever 28. This lever 28 is formed with an opening through which the shaft 11 and key 14 freely pass, as indicated in Fig. 4, and the lever 28 is tiltably carried by a pair of pointed members 29' (Fig. 5) extending into little conical recesses in the opposite side face of lever 28 and carried by members 29 fixed to the top face of member 12. As is evident from Fig. 5 knife edge 27 extends across a cutout formed in the left end portion of the lever 28 as viewed in Fig. 5. The axis of the members 29' is normal to the axis of shaft 11. The tilting movement of lever 28 is limited by the head of a screw 30 threaded into the member 12 and extending freely from an opening in the lever 28. Spring 31 is coiled about the screw 30 and bears against member 12 and the bottom face of lever 28 to urge the latter upwardly against the head of the screw 30.

Figure 6:
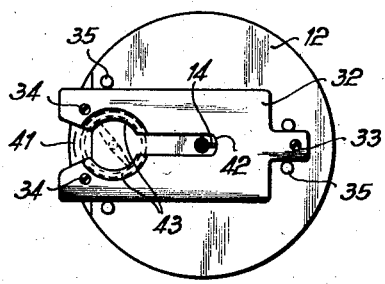
Fig. 6 is a view of the structure of Fig. 4 taken along line 6—6 in the direction of the arrows.

A plate 32 is located beneath the lever 28 between the latter and member 12, the configuration of plate 32 being shown most clearly in Fig. 6. The plate 32 is laterally shiftable and is formed with an elongated cutout through which shaft 11 and key 14 freely extend, as indicated in Fig. 6. The plate 32 is connected to three screw members 33 and 34 having bottom pointed ends which bear against the top face of member 12, this member 12 being provided at its left, as viewed in Figs. 4 and 6, with a downwardly inclined top surface portion which engages the bottom ends of the longer screw members 34. The plate 32 extends at its right end portion, as viewed in Fig. 6, through a pair of guide pins 35 fixed to the member 12 and guiding the plate 32 for shifting movement to the left and right, as viewed in Fig. 6. The plate 32 furthermore is formed in its top face with an annular cutout slightly larger than the wheel to be balanced and the shaft of this wheel extends freely through the plate 32 into engagement with the knife edges 26 and 27, as indicated in Fig. 4.

Figure 5:
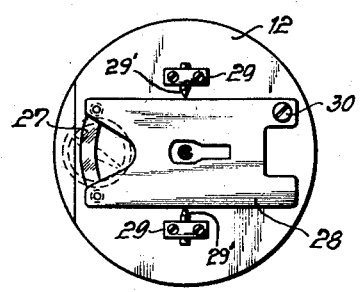
Fig. 5 is a view of the structure of Fig. 4 taken along line 5—5 of Fig. 4 in the direction of the arrows.

A mechanical stroboscope means is provided so that the operator may easily observe the balance wheel during the balancing thereof. This stroboscope means includes a light source 36 whose light beam is directed through a condenser 37. The light source 36 is carried by the bottom plate 7 while the condenser 37 is carried by the post 9. After passing through the condenser 37 the light beam passes through a cutout of plate 6 and the top plate portion of the fan 13 is formed with a slot 38 through which the light beam 10 passes when this slot 38 is aligned with the condenser 37. After passing through the slot 38 the light beam is reflected from the mirror 39, carried by a post 40 which is fixed to the plate 5, onto the article to be balanced. The mirror 39 is adjustably mounted in any known way, and it is apparent that with this stroboscope means the article to be balanced will appear to be stationary to the operator. The above described structure operates as follows:

By depressing the right end of the lever 28, as viewed in Figs. 4 and 5, the left end thereof which carries the knife edge 27 is raised so that the operator can with tweezers or the like place a balance wheel into the apparatus. This balance wheel may have the shaft thereof pass through the cutout 41 of the plate 32 shown at the left portion thereof, as viewed in Fig. 6. Thus, the bottom end of the shaft of the balance wheel may be located just to the right of the knife edge 26, as viewed in Fig. 4, and then the plate 28 is released so that the knife edge 27 becomes located just to the left of the top end of the shaft of the balance wheel. The screw 30 may be adjusted so as to properly locate the knife edge 27. Then the motor is turned on and the knob 16 is maintained stationary so that the gear 17′ also remains stationary and the drilling structure rotates around the gear 17′ because the drilling head 15 turns together with the shaft 11 as a result of the connection of the drilling head 15 to shaft 11 by the key 14. In the meantime, the centrifugal force acts on the balance wheel so as to locate the unbalanced part thereof at the greatest distance from the shaft 11, and this may be very easily observed because the wheel appears stationary as a result of the intermittent illumination provided by the rotating slot 38 of the fan 13. The sharpness of the image seen by the operator is sufficient because the radial distance of the slot 38 from shaft 11 is considerably greater than the radius of the part of the apparatus which is observed by the operator and to which the light is directed.

The centrifugal force acts also on the rotating plate 32 so that the edge 42 thereof (Fig. 6) becomes located against the key 14. An unillustrated spring may also be provided to urge the plate 32 with its edge 42 against the key 14. As a result, the balance wheel which is pressed by centrifugal force against the knife edges floats freely over the cutout 43 of the plate 32 (Fig. 6). The operator now depresses the handle 16 so that the inclined edge of key 14 located just above plate 32 in the position shown in Fig. 4 engages the edge 42 of the plate 32 and urges the latter slightly to the right, as viewed in Fig. 4. As a result, the pins 34 move up the inclined top face portion of member 12 and the plate 32 moves up to engage and support the rim of the balance wheel, the latter being thus moved from the knife edge 26 and 27 and being supported in this way for the drilling operation which follows immediately thereafter. During the further downward movement of knob 16 the inclined edge of key 14 leaves the plate 32 and the latter then remains stationary with respect to the shaft 11 and supports the balance wheel. During further depression of the handle 16 the drill engages the rim of the balance wheel and the operator can easily observe the drilling process because of the stroboscope means. After some of the material of the balance wheel is cut away the handle 16 is permitted to move up under the action of spring 44 and the balance wheel is again released to be urged by centrifugal force against the knife edges to repeat the above process. Thus, it is possible to observe the result of moving some of the material and in this way the above steps are repeated until the balance of the process is completed.

Figure 7:
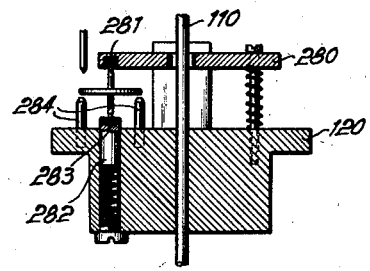
Fig. 7 is a fragmentary sectional view illustrating the details of a different embodiment of a structure for carrying an article to be balanced.

The brake means 18—21 serves for quickly stopping the apparatus. Upon depression of the knob 18 the brake block 21 presses against the top face of the fan 13. Thus, during the balancing process it is possible with a short depression of the knob 18 to give swinging movements to the balance wheel so that its movements may be observed several times after drilling the balance wheel. Where the shaft of the balance wheel has ends adapted to engage jewels in a watch or the like, then the structure of Fig. 7 may be used to carry the wheel to be balanced. According to this structure the tilting lever 280 is supported in the same way as the lever 28 and carries at its left end portion, as viewed in Fig. 7, a jewel 281 instead of a knife edge. Also, a jewel 283 replaces the lower knife edge, this jewel 283 being carried by a plunger 282 which rests on a spring within a bore of the annular member 120, the plunger 282 being slidable within this bore and the spring being retained therein by a threaded plug. The annular member 120 is fixed to the shaft 110 and a plurality of members 284 are provided to support the balance wheel during drilling thereof when the balance wheel is depressed by the wheel, the plunger 282 moving into member 120 during this depression of the balance wheel. Except for the above differences, the structure of Fig. 7 is otherwise identical with that of Fig. 4.

It is apparent that the invention is not limited to a particular type of bearing for the article to be balanced. For example, plain bearings of shafts in jewels and the like can also be accommodated.

It will be understood that each of the elements described above, or two or more together, may also find a useful application in other types of balance apparatus differing from the types described above.

While the invention has been illustrated and described as embodied in balance apparatus for small articles, it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be secured by Letters Patent is:

1. Balancing apparatus comprising, in combination, support means; an elongated shaft supported for rotation about its axis by said support means; carrier means, fixed to said shaft for rotation therewith, for carrying an article to be balanced for free turning movement about its axis with the axis of the article extending parallel to and at a distance from said shaft so that the article to be balanced rotates about an axis eccentric to itself whereby any unbalance existing in the article will cause turning of the article about its own axis until the heaviest portion thereof assumes a position more distant from the axis of rotation of the carrier means than any other part of the article; a drilling head connected to said shaft for rotation therewith and including a drill carrier spaced from the axis of said shaft a distance greater than said distance of axis of the article from said shaft; and transmission means for transmitting rotation of said shaft to said drill carrier so that a drill carried by the latter may cut away part of an article to be balanced simultaneously with rotation of the latter about the shaft axis after the heaviest portion of the article has assumed said position.

2. Balancing apparatus comprising, in combination, a housing; a motor supported within said housing and including an elongated shaft extending outwardly beyond said housing; carrier means removably fixed to said shaft for carrying an article to be balanced for free turning movement about its axis with the axis of the article extending parallel to and spaced from said shaft; light means carried by said housing for directing a light beam on the article to be balanced; and fan means fixed to said shaft for ventilating said housing, said fan means including a plate formed with a cutout through which said light beam passes at a predetermined part of each revolution of said fan means so that the movement of the article about its axis can be observed by the operator.

3. Balancing apparatus comprising, in combination, a housing; a motor supported within said housing and including an elongated shaft extending outwardly beyond said housing; carrier means removably fixed to said shaft for carrying an article to be balanced for free turning movement about its axis with the axis of the article extending parallel to and spaced from said shaft; light means carried by said housing for directing a light beam on the article to be balanced; fan means fixed to said shaft for ventilating said housing, said fan means including a plate formed with a cutout through which said light beam passes at a predetermined part of each revolution of said fan means so that the movement of the article about its axis can be observed by the operator; and means carried by said shaft, for rotation therewith, for cutting away part of an article to be balanced while said article turns about the axis of said shaft.

References Cited in the file of this patent

UNITED STATES PATENTS

| | | |
|---|---|---|
| 1,099,425 | Carper | June 9, 1914 |
| 1,475,153 | Athenas | Nov. 20, 1923 |
| 2,536,226 | Reynolds | Jan. 2, 1951 |
| 2,636,382 | Martin | Apr. 28, 1953 |
| 2,690,075 | Kryeske | Sept. 28, 1954 |

FOREIGN PATENTS

| | | |
|---|---|---|
| 71,073 | Germany | Sept. 22, 1893 |